United States Patent
Lee et al.

(10) Patent No.: US 11,273,376 B2
(45) Date of Patent: Mar. 15, 2022

(54) METHOD, APPARATUS, COMPUTER PROGRAM, AND COMPUTER PROGRAM PRODUCT FOR PROVIDING GAME

(71) Applicant: NEXON KOREA CORPORATION, Seongnam-si (KR)

(72) Inventors: Kwang Sup Lee, Yongin-si (KR); Sung Hwan Yoon, Seongnam-si (KR)

(73) Assignee: NEXON KOREA CORPORATION, Seongnam-si (KR)

(*) Notice: Subject to any disclaimer, the term of this patent is extended or adjusted under 35 U.S.C. 154(b) by 0 days.

(21) Appl. No.: 16/503,776

(22) Filed: Jul. 5, 2019

(65) Prior Publication Data
US 2020/0009461 A1    Jan. 9, 2020

(30) Foreign Application Priority Data
Jul. 6, 2018    (KR) .......................... 10-2018-0078927

(51) Int. Cl.
| | |
|---|---|
| *A63F 9/24* | (2006.01) |
| *A63F 11/00* | (2006.01) |
| *G06F 13/00* | (2006.01) |
| *G06F 17/00* | (2019.01) |
| *A63F 13/58* | (2014.01) |
| *A63F 13/65* | (2014.01) |

(Continued)

(52) U.S. Cl.
CPC .............. *A63F 13/58* (2014.09); *A63F 13/65* (2014.09); *G06K 9/344* (2013.01); *G06K 19/06037* (2013.01)

(58) Field of Classification Search
USPC .................. 463/1, 15, 20, 22, 39, 42, 43
See application file for complete search history.

(56) References Cited

U.S. PATENT DOCUMENTS

| | | | | |
|---|---|---|---|---|
| 2002/0151366 | A1* | 10/2002 | Walker .................... | G07F 17/32 |
| | | | | 463/42 |
| 2006/0035692 | A1* | 2/2006 | Kirby .................... | A63F 13/335 |
| | | | | 463/6 |

(Continued)

FOREIGN PATENT DOCUMENTS

| | | |
|---|---|---|
| KR | 2010-0121898 A | 11/2010 |
| KR | 10-1192832 B1 | 12/2012 |

(Continued)

OTHER PUBLICATIONS

"What is the Crystal Bonus Coupon?", May 29, 2018, retrieved from https://m.nexon.com/faq/get/19?client_id=MTY3MDg3NDAy, 1 page.

(Continued)

*Primary Examiner* — Adetokunbo O Torimiro
(74) *Attorney, Agent, or Firm* — Kilpatrick Townsend & Stockton LLP

(57) ABSTRACT

Provided is a game providing method comprising storing a plurality of codes for changing a property of an object in an online game; receiving a code provided by a user of the online game; determining whether the received code corresponds to one of the plurality of codes; and, based on determining that the received code corresponds to one of the plurality of codes, changing, based on a predetermined condition, the property of the object with which the user interacts from a first value to a second value.

12 Claims, 8 Drawing Sheets

(51) Int. Cl.
  *G06K 19/06* (2006.01)
  *G06K 9/34* (2006.01)

(56) References Cited

U.S. PATENT DOCUMENTS

| | | | | |
|---|---|---|---|---|
| 2007/0125620 A1* | 6/2007 | Sorenson | ............... | G06Q 20/18 194/217 |
| 2009/0171806 A1* | 7/2009 | Klinger | .............. | G06Q 30/0601 705/26.1 |
| 2010/0122176 A1* | 5/2010 | Ye | ........................ | G06Q 40/04 715/738 |
| 2013/0047229 A1* | 2/2013 | Hoefel | .................... | G06F 21/62 726/7 |
| 2014/0180790 A1* | 6/2014 | Boal | .................. | G06Q 30/0251 705/14.42 |

FOREIGN PATENT DOCUMENTS

| | | | |
|---|---|---|---|
| KR | 10-2016-0022150 A | 2/2016 | |
| WO | 2016/028070 A1 | 2/2016 | |

OTHER PUBLICATIONS

Office Action dated Jan. 31, 2020 in Korean Patent Application No. 10-2018-0078927, filed Jul. 6, 2018, 14 pages.
Notification of Reason for Refusal for KR 10-2021-053242 dated Jul. 28, 2021, all pages.

* cited by examiner

METHOD, APPARATUS, COMPUTER PROGRAM, AND COMPUTER PROGRAM PRODUCT FOR PROVIDING GAME

CROSS-REFERENCE TO RELATED APPLICATION(S)

This application is based on and claims priority under 35 U.S.C. § 119 to Korean Patent Application No. 10-2018-0078927 filed on Jul. 6, 2018, in the Korean Patent Office, the disclosure of which is incorporated by reference herein in its entirety.

BACKGROUND

1. Field

Embodiments of the disclosure relate to a method, apparatus, computer program, and computer program product for providing a game, and more particularly, to changing a property of an object in an online game.

2. Description of the Related Art

As the computing devices and network environments have evolved, the number of users who enjoy online games has continued to increase, and the boundaries between online games and offline games have also become faint. Users enjoy online games by competing and collaborating with each other within the online games.

Items used in such games play a very important role in the game progress of the user. Although the purpose of use of the item varies depending on the purpose of the game and the purpose that the user intends to achieve within the game, the item is generally used to cover the lack of game skills of the user and the poor capability of the user's avatar in the game.

The user may acquire items, via his/her game progress, by accomplishing a certain mission in the game, by trading with another user, and/or by paying a certain amount of money to a game provider.

Generally, items that users can purchase in an online game have fixed properties, for example, price, performance, effect, and the like. In order to induce users to purchase items, the game provider may provide the users with discount promotions for the prices of the items.

Discount promotions may be applied to all users in a specific period of time, or to some users who meet certain conditions. If the specific period of time elapses, users are no longer able to take advantage of the discount promotions. If the same or similar discount promotions are re-offered even after the specific period of time, it may disappoint users who took advantage of the discount promotions at the first time. If discount promotions are provided only to certain users satisfying a certain condition, other users who are not eligible for the discount promotions may feel alienated, and some users may play the game only to satisfy the condition regardless of the nature of the game. If promotional codes for certain items are distributed to users, a potential revenue loss may occur in proportion to the number of the distributed promotional codes and the prices of the items, and regardless of the number of users who actually use the promotional codes, users who already have the same items may experience a drop in the value of their items in proportion to the number of the distributed promotional codes.

Accordingly, there is a demand for a technology capable of enhancing promotion effects in online games while maintaining the immersion and tension of users in the game.

SUMMARY

Embodiments of the disclosure relate to means for improving a promotional effect in an online game.

Embodiments of the disclosure relate to means for providing promotions to users without a potential revenue loss of an online game provider.

Embodiments of the disclosure relate to means of providing promotions for enhancing an online game provider's affiliation power with a third party.

Provided is a game providing method comprising: storing a plurality of codes configured to change a property of an object in an online game; receiving a code provided by a user of the online game; determining whether the received code corresponds to one of the plurality of codes; and when the received code corresponds to one of the plurality of codes, changing, based on a predetermined condition, the property of the object with which the user interacts, from a first value to a second value.

In an embodiment, the transaction information for the online game includes transaction information for the object.

In an embodiment, the plurality of codes are associated with transaction means, respectively.

In an embodiment, the plurality of codes are printed on the transaction means, respectively.

In an embodiment, the predetermined condition comprises whether transaction information is generated based on a transaction means associated with the received code.

In an embodiment, the transaction means comprise at least one of a credit card, a check card, a membership card, an account number, a gift certificate, or a gift card.

In an embodiment, the property of the object with which a user, who does not provide a code corresponding to one of the plurality of codes, interacts remains unchanged.

In an embodiment, the object includes an purchasable object in the online game, the property of the object includes at least one of a price, a use requirement, a wearing requirement, a quantity, a performance, or a expiration period of the object.

In an embodiment, the second value is less than the first value when the property of the object is at least one of a price, a use requirement, or a wearing requirement of the object.

In an embodiment, the second value is greater than the first value when the property of the object is at least one of a quantity, a performance, or a expiration period of the object.

In an embodiment, the plurality of codes correspond to an identifier of the object.

In an embodiment, the code provided by the user is provided by at least one of a character input method, an optical character recognition method, a bar code recognition method, or a matrix code recognition method.

In an embodiment, when the predetermined condition is not satisfied for a predetermined period of time, the received code expires.

In an embodiment, the predetermined period is determined by based on a date on which the code is provided by the user.

Provided is a game providing apparatus comprising: a memory storing instructions; and at least one processor configured to execute the instructions to: store a plurality of codes configured to change a property of an object in an online game; receive a code provided by a user of the online game; determine whether the received code corresponds to one of the plurality of codes; and when the received code corresponds to one of the plurality of codes, change, based on a predetermined condition, the property of the object with which the user interacts, from a first value to a second value.

Provided is a game providing method comprising: receiving a code provided by a user of an online game; transmitting the code to a server storing a plurality of codes configured to change a property of an object; receiving transaction information for the online game from the user; and transmitting the transaction information to the server, wherein when the code corresponds to one of the plurality of codes and the transaction information is received at the server from the user, the property of the object with which the user interacts, changes from a first value to a second value.

Provided is a game providing apparatus comprising: a memory storing instructions; and at least one processor configured to execute the instructions to: receive a code provided by a user of an online game; transmit the code to a server storing a plurality of codes configured to change a property of an object; receive transaction information for the online game from the user; and transmit the transaction information to the server, wherein when the code corresponds to one of the plurality of codes and the transaction information is received at the server from the user, the property of the object with which the user interacts, changes from a first value to a second value.

Provided are game providing computer program products comprising a computer readable medium storing instructions which, when executed by at least one processor, cause the at least one processor to carry out the above game providing methods.

According to an embodiment, a promotion effect of an online game can be improved.

According to an embodiment, a promotion can be provided to a user without potential revenue loss of an online game provider.

According to an embodiment, an online game provider's affiliation power with a third party can be enhanced.

BRIEF DESCRIPTION OF THE DRAWINGS

The above and other advantages of the embodiments will be more clearly understood from the following description taken in conjunction with the accompanying drawings, in which.

DETAILED DESCRIPTION

Figure 1:
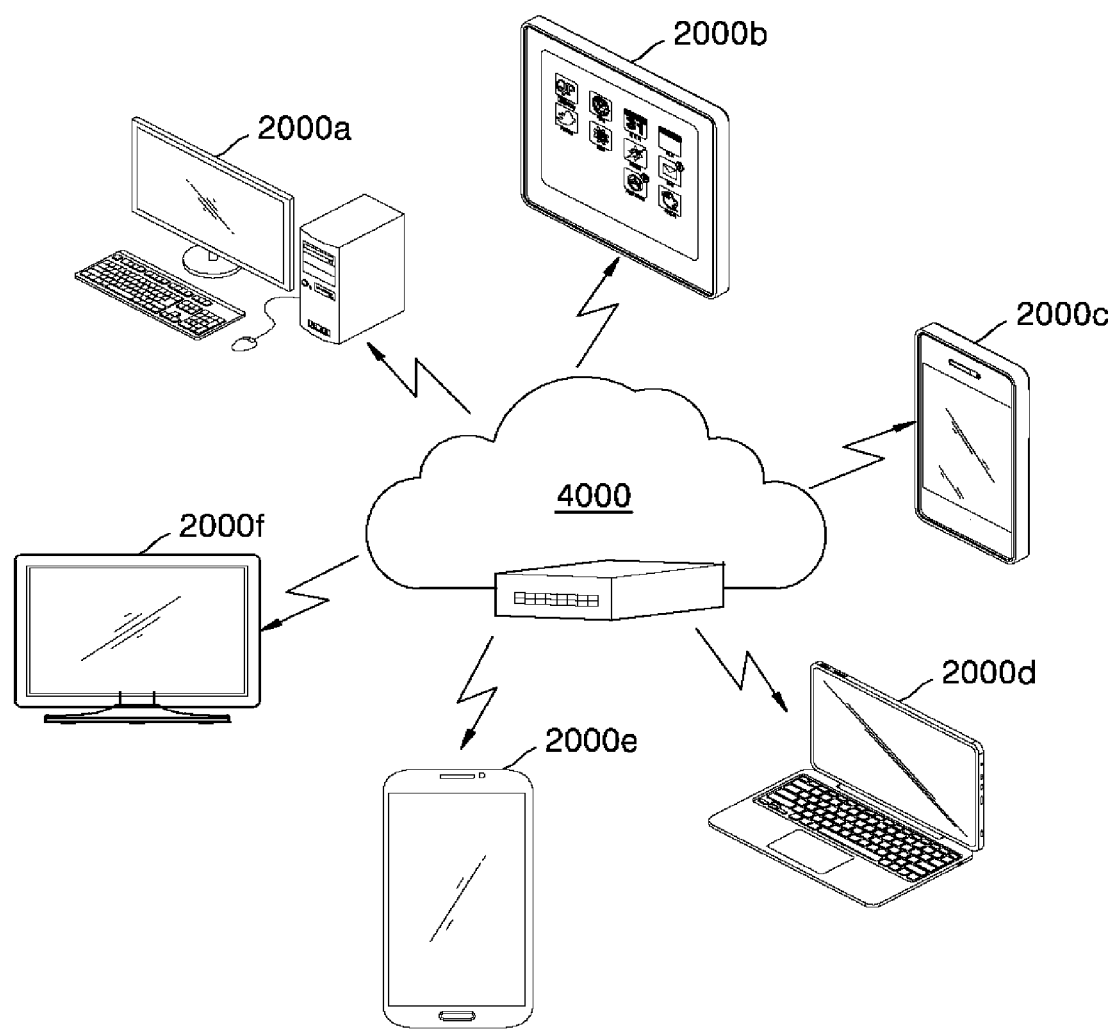
FIG. 1 illustrates an online game providing system including a server and an electronic device according to an embodiment.

Hereinafter, example embodiments are described in detail with reference to the accompanying drawings. By referring to contents illustrated in the accompanying drawings, a method, apparatus, computer program, and a computer program product according to the example embodiments are explained. Like reference numbers in the drawings may indicate identical, functionally similar, and structurally similar components.

Terms including ordinals such as first, second, etc. may be used to identify various components, but the components are not limited by the terms. These terms are used for the purpose of distinguishing one component from another. For example, a first component may be referred to as a second component. Similarly, a second component may also be referred to as a first component. The term "and/or" includes any combination of a plurality of related items or any one of a plurality of related items.

Terms used herein are used to illustrate example embodiments, and are not intended to limit or restrict the disclosure. As used herein, the singular forms "a", "an" and "the" are intended to include the plural forms as well, unless the context clearly indicates otherwise. It should be understood that the terms "comprising," "including," and "having" are inclusive and therefore specify the presence of stated features, numbers, steps, operations, components, units, or their combination, but do not preclude the presence or addition of one or more other features, numbers, steps, operations, components, units, or their combination.

The expression "at least one of a, b or c" indicates only a, only b, only c, both a and b, both a and c, both b and c, all of a, b, and c, or variations thereof.

When an element is "connected" to another element, the elements may not only be "directly connected", but may also be "electrically connected" via another element therebetween or wirelessly. The term " . . . unit", " . . . module", etc. may refer to a unit in which at least one function or operation is processed and may be embodied as hardware, software, or a combination of hardware and software.

A "client" may refer to a user, a gamer, a player, and an apparatus, such as an electronic device, used by "client", depending on the context. The user, the gamer, and the player may refer to an account that is used in an online platform and belongs to an individual. The user, the gamer, and the player may refer to an avatar and/or a character belonging to the account.

An "online platform" may refer to a community to which users belong. The online platform may refer to a server that serves the online platform. The online platform may be, but is not limited to, an online game, a virtual game space provided by an online game, an online shopping mall, an online broadcasting platform, an online relaying platform, an online streaming platform, and an online community. Avatars or characters of users may exist within the online platform.

An "object" may refer to a digital content present in an online platform, such as an online game. For example, the object may be an avatar or a character of a user in the game. The object may be an item used or worn in the game, but is not limited thereto. The object may be traded in the platform, such as an online game, with a certain value. For example, the object may be traded between users or between a user and a game provider.

An "item" may refer to a digital content that a user or his or her character can use in the online game. The item may include products, goods, contents, or anything that is used in the game. For example, the item may be a piece of equipment worn by the character in the game, such as a weapon, an armor, clothing, an accessory, a vehicle rode by the character, things consumed by the character, a skin of the character, goods spent in the game, and, a currency used in the game, but is not limited to thereto. Stats or abilities of a user's character may change temporarily, permanently, or conditionally by using an item.

A "game providing apparatus" may refer to an apparatus for providing a user with a game. The game providing apparatus may be an electronic device of a user, but is not limited thereto. For example, the game providing apparatus may be a server, or a system including both of the electronic device of the user and the server. A game providing method may be performed at the game providing apparatus. The game providing method may be performed at the electronic device of the user, but is not limited thereto. For example, the method may be performed at the server, or the system including both of the electronic device and the server. In an embodiment, all steps of the game providing method may be performed at the electronic device of the user, but are not limited thereto. For example, some steps of the game providing method may be performed at the electronic device of the user, and some other steps of the game providing method may be performed at the server. The game providing method may be performed by interaction between the electronic device and the server.

FIG. 1 illustrates an online game providing system including a server and an electronic device according to an embodiment.

The online game providing system according to an embodiment may include a server 4000 and a plurality of electronic devices 2000*a*, 2000*b*, 2000*c*, 2000*d*, 2000*e*, and 2000*f* as shown in FIG. 1. The server 4000 may provide an online game to the plurality of electronic devices 2000*a*, 2000*b*, 2000*c*, 2000*d*, 2000*e*, and 2000*f* by servicing online games through the network.

FIG. 1 shows, as examples of electronic devices used by a user, a desktop computer 2000*a*, a tablet 2000*b*, a mobile phone 2000*c*, a laptop 2000*d*, a smartphone 2000*e*, and a television 2000*f*, but are not limited thereto. The electronic devices may include various electronic devices such as a personal digital assistant (PDA), a portable multimedia player (PMP), a navigation device, an MP3 player, a digital camera, a refrigerator, a washing machine and a vacuum cleaner.

According to an embodiment, the server 4000 may be operated by a game provider, and server 4000 may include, but is not limited to, a single server, a collection of servers, and a cloud server. The server 4000 may provide online games to users, and may include a database for storing data of the users. The server 4000 may include a transaction server for generating and processing transactions.

According to an embodiment, a network may refer to connections established (or formed) using any communication means. The network may be established between electronic devices 2000*a*, 2000*b*, 2000*c*, 2000*d*, 2000*e* and 2000*f* The network may established between electronic devices 2000*a*, 2000*d*, 2000*e*, and 2000*f* and the server 4000.

The communication means may be used with a certain communication standard, a certain frequency band, a certain protocol, and/or a certain channel. The communication means includes means using a short distance communication, a long distance communication, a wireless communication, and/or a wired communication, but is not limited thereto. For example, the communication means may include, but is not limited to, the Internet, wireless fidelity (Wi-Fi), Bluetooth, Bluetooth Low Energy (BLE), Near Field Communication (NFC), Zigbee, 3G, 4G, Long-Term Evolution (LTE), 5G.

The short distance communication means may allow devices within a short range to communicate with each other. The short distance communication means may include, but is not limited to, Bluetooth, BLE, NFC, Zigbee.

The long distance communication means may allow devices to communicate with each other regardless of distances between them. For example, the long distance communication means may, but is not limited thereto, comprise a means communicating through a repeater, such as an access point (AP), and/or a means communicating through a cellular network (3G, 4G, LTE, 5G, etc.).

Communication between the server 4000 and the electronic devices 2000*a*, 2000*b*, 2000*c*, 2000*d*, 2000*e*, and 2000*f* may be performed through any communication means while the server 4000 serving the online game through the network.

An online game may include a role playing game (RPG), a tabletop RPG (TRPG), a massively multiplayer online RPG (MMORPG), a multiplayer online battle arena (MOBA) game, an Aeon of Strife (AOS) game, a real time strategy (RTS) game, a first person shooter (FPS) game, a trading card game (TCG), a collectible card game (CCG), a sports game, a fighting game, a puzzle game, a shooting game, etc., but is not limited thereto. A competition between users or a competition between a user and a computer (e.g., artificial intelligence) may occur in the online game. The online game may be implemented in various forms.

The electronic devices 2000*a*, 2000*b*, 2000*c*, 2000*d*, 2000*e*, and 2000*f* may be provided with a game service from the server 4000. The game service may be displayed on the electronic devices 2000*a*, 2000*b*, 2000*c*, 2000*d*, 2000*e*, and 2000*f*, and users can enjoy the game service by interacting with the server 4000 and/or other user.

Figure 2:
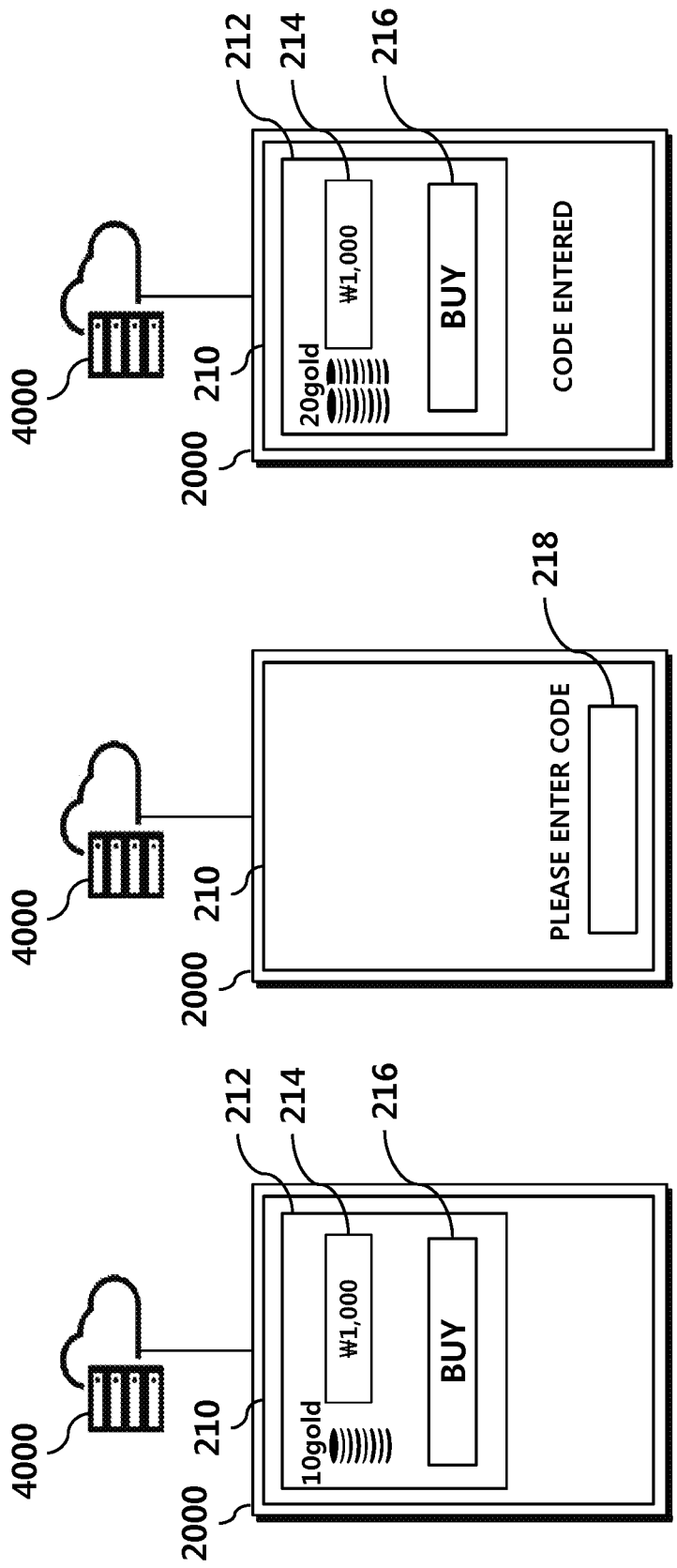
FIGS. 2A, 2B, and 2C are diagrams for explaining a method of changing a property of an object based on a code provided by a user according to an embodiment.

FIGS. 2A, 2B, and 2C are diagrams for explaining a method of changing a property of an object based on a code provided by a user according to an embodiment.

In a server 4000, a program for servicing an online game may be executed, and the online game may be serviced to an electronic device 2000 through a network. In the electronic device 2000, a game program for playing the online game may be executed. Although FIG. 2A and following figures illustrate the electronic device 2000 and the server 4000 for concise explanation, the server 4000 may service the online game to more electronic devices. Although it is described that the electronic device 2000 is used by one user, the user may use a plurality of electronic devices.

As shown in FIG. 2A, a graphic user interface (GUI) 210 of the online game may be displayed on the electronic device 2000. Users may interact in the online game through the displayed online game GUI 210, and the electronic device 2000 may communicate with the server 4000 based on this interaction. The interaction may include interaction with another user and/or interaction with a non-player character (NPC) in the online game.

Referring to FIG. 2A, the online game GUI 210 may include a purchase GUI 212 for purchasing an object interacting with a user. The purchase GUI 212 may be displayed when the user and/or the user's character enters a shop realized in the online game and selects the object, but is not limited thereto. The purchase GUI 212 of the object may include a description of characteristics and/or properties of the object, such as a price, a use requirement, a wearing requirement, a quantity, the number, performance, and a expiration period of the object, but is not limited thereto. The object may be money spent in an online game. Referring to FIG. 2A, the money object is a gold coin object, but is not limited thereto. The purchase GUI 212 may include a description on a quantity of the money object, 10 gold coins, or a price 214 of the money object, 1,000 won. The purchase GUI 212 may include a purchase button 216 for purchasing the money object. Referring to FIG. 2A, a user of the electronic device 2000 can pay 1,000 won to the game provider and receive 10 gold coins by selecting the purchase button 216.

The game provider may provide promotions to users. The game provider may provide users with a code configured to change a property of an object. In an embodiment, the server 4000 may store a plurality of codes.

Referring to FIG. 2B, the online game GUI 210 may include a code input field 218. The code input field 218 may be implemented in the purchase GUI 212, or may be located in a web-page outside the online game GUI 210. The user may enter a code provided by the game provider into the code input field 218.

The code may be entered by the user into the code input field 218. For example, the user may directly type a code composed of a string of characters on the electronic device 2000. The code may be entered by capturing the string of characters and using optical character recognition (OCR). When a code is in a form of a barcode or a matrix code, the code may be input by scanning the barcode or matrix code at the electronic device 2000.

In an embodiment, the code entered by the user into the electronic device 2000 may be transmitted to the server 4000. The server 4000 may determine whether the code received from the electronic device 2000 corresponds to one of a plurality of stored codes. The server 4000 may determine validity of the code received from the electronic device 2000.

In an embodiment, when the code received from the electronic device 2000 is valid, the server 4000 may notify the electronic device 2000 that a property of the object changes from a first value to a second value. In an embodiment, the property of the object may be a price or quantity of the object.

In an embodiment, if the code entered by the user is valid, the server 4000 may change the property of the object with which the user interacts, from a first value to a second value. In an embodiment, if the code entered by the user is valid, the server 4000 may change based on a predetermined condition the property of the object with which the user interacts, from a first value to a second value, The property of the object changes for the user who entered the code, and the property of the object remains unchanged for other users who do not provide any code or whose codes are invalid.

The electronic device 2000 may display that 10 gold coins can be purchased by 1,000 as illustrated FIG. 2A before the code is entered. The electronic device 2000 may and display that 20 gold coins can be purchased with 1,000 won as illustrated in FIG. 2C after the code is entered.

In an embodiment, codes may be associated with an object used in an online game. For example, the codes may be associated with product identification (PID) of the object. Accordingly, when a code entered by a user is valid and transaction information for an object corresponding to the code is received at the server 4000, the property of the goods object may be changed from a first value to a second value. For example, when a code entered by a user is associated with a PID of a money object (gold coin object) in the game and is valid, a property of the money object (gold coin object) may be changed from a first value to a second value. Referring to FIG. 2C, when a user purchases a money object (gold coin object) and transaction information is received at the server 4000, the server 4000 may change the quantity of the gold coin object for 1,000 won from 10 to 20, or change the price from 100 won to 50 won per one gold coin. Accordingly, the user can obtain 10 more gold coin objects as a bonus. Accordingly, the user can obtain the money object (gold) at a discounted price. The properties of the object may be changed variously. For example, the first value of a money object may be equal to 10 first coins, and the second value of the money object may be equal to 10 first coins and 10 second coins. Features of changing a property of an object from a first value to a second value are described herein, other features of displaying the property of the object changed from the first value to the second value should be understood as equivalent to the features of the changing, as long as the same effect is produced as a result.

In an embodiment, if the code entered by the user is valid, the server 4000 may change the property of the object with which the user interacts, from a first value to a second value. In an embodiment, if the code entered by the user is valid, the server 4000 may change based on a predetermined condition the property of the object with which the user interacts, from a first value to a second value, For example, the predetermined condition may include, but is not limited to, whether the object is purchased. For example, the predetermined condition may include whether a user has made a transaction in the online game, whether a transaction is made through a predetermined transaction means in the online game, whether an amount of a transaction is greater than a predetermined value, whether a play time of the user is longer than a predetermined length, whether a predetermined mission and/or level is accomplished, etc., and these conditions may be considered together in parallel.

According to an embodiment, because definite loss due to the object does not occur until the predetermined condition is satisfied, thus, a promotion effect of the online game can be improved and the online game provider can avoid potential revenue loss due to the discount of the object.

Figure 3:
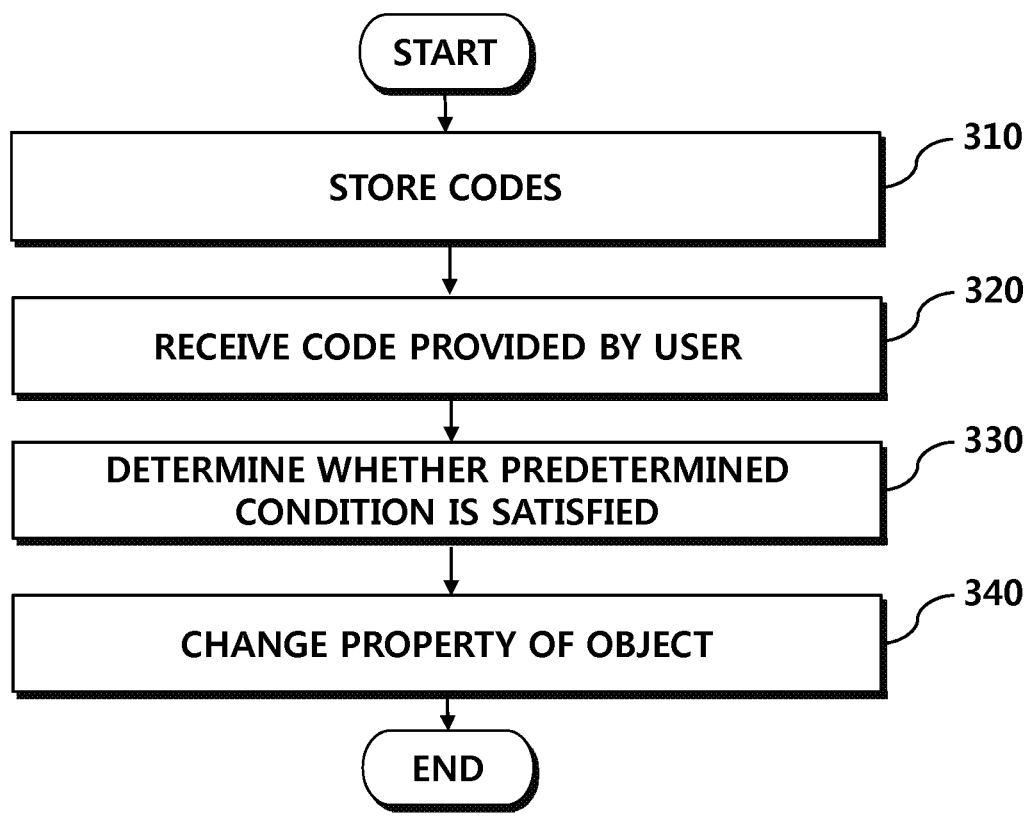
FIG. 3 is a flowchart of a method for changing a property of an object based on transaction information of a user according to an embodiment.

FIG. 3 is a flowchart of a method for changing a property of an object based on transaction information of a user according to an embodiment.

In 310, the server may store a plurality of codes configured to change a property of an object in an online game. The property of the object may be changed from a first value to a second value. In an embodiment, the plurality of codes may be associated with a transaction means. The plurality of codes may be printed on the transaction means.

In 320, the server may receive a code provided by a user of the online game from the electronic device. The code may be entered in the online game, or may be entered on a separate page from the online game. The server may determine whether the received code corresponds to one of the plurality of stored codes. The server may determine whether the received code is a valid code.

In 330, the server may determine whether a predetermined condition is satisfied, when the received code is valid. In an embodiment, the predetermined condition may include whether a transaction for the object with which a user interacts is made, whether a user has made a transaction in the online game, whether a transaction is made through a predetermined transaction means in the online game, whether an amount of a transaction is greater than a predetermined value, whether a play time of the user is longer than a predetermined length, whether a predetermined mission and/or level is accomplished, etc., and these conditions may be considered together in parallel.

In 340, the server may change the property of the object if the predetermined condition is satisfied. The property of the object may be changed from a first value to a second value. For example, the first value of a money object may be equal to 10 first coins, and the second value of the money object may be equal to 10 first coins and 10 second coins. In an embodiment, a price for buying a certain quantity of the money object may decrease, or the quantity of the money object may increase. The properties of the object may be changed variously. Features of changing a property of an object from a first value to a second value are described herein, other features of displaying the property of the object changed from the first value to the second value should be understood as equivalent to the features of the changing, as long as the same effect is produced as a result.

Figure 4:
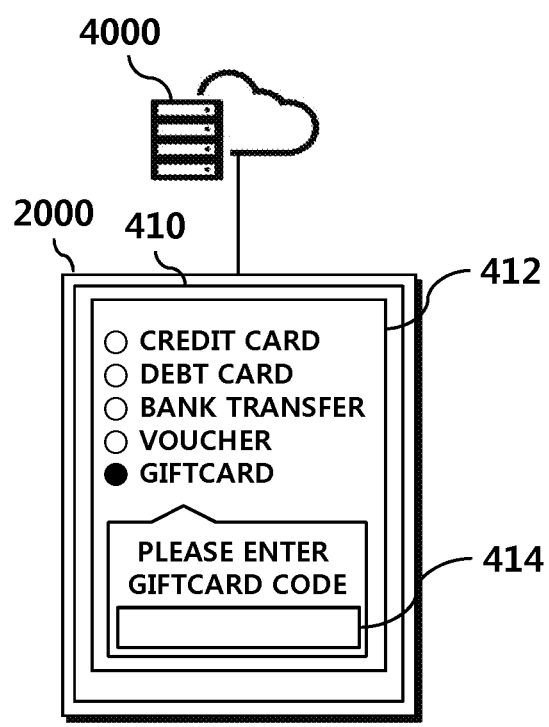
FIG. 4 is a diagram for explaining a method for changing a property of an object based on a transaction means of a user according to an embodiment.

FIG. 4 is a diagram for explaining a method for changing a property of an object based on a transaction means of a user according to an embodiment.

Referring to FIG. 4, when a user of an electronic device 2000 selects a purchase button of the object, a transaction means selection GUI 412 may be displayed in an online game GUI 410. The transaction means may include, but is not limited to, a credit card, a debt card, a membership card, a bank transfer, a voucher, and a gift card. Referring to FIG. 4, a gift card may be selected as a transaction means, and an input field 414 for entering a gift card code may be displayed.

In an embodiment, a code configured to change a property of an object may correspond to a predetermined transaction means. For example, a code may be associated with a gift card, and the server 4000 may, if a code provided by the user is valid, change the property of the object based on whether a transaction is made by the gift card associated with the code in the online game. That is, even if the code provided by the user is valid, the property of the object may not be changed when a transaction is made by a transaction means not being associated with the code in the online game. A code configured to change the property of the object may be printed on a transaction means, such as a gift card. A user who purchased the gift card may obtain the code from the gift card and use the code to change the property of the object.

According to an embodiment, the property of the object may be changed only when a code provided by a user is valid and a transaction is made in the online game through a transaction means associated with the code. Accordingly, it may be easier for an online game provider to affiliate with a publisher or a issuer of the transaction means.

According to an embodiment, the code may be associated with a credit card, a debt card, a membership card, an account number, a voucher, and a gift card, but is not limited thereto. For example, the code may be associated with a credit card issued by a certain company or bank, and the property of the object may be changed only when a transaction of a user who provides the code is made by a credit card issued by the certain company or bank. Accordingly, an online game provider's affiliation power with a third party may be enhanced.

Figure 5:
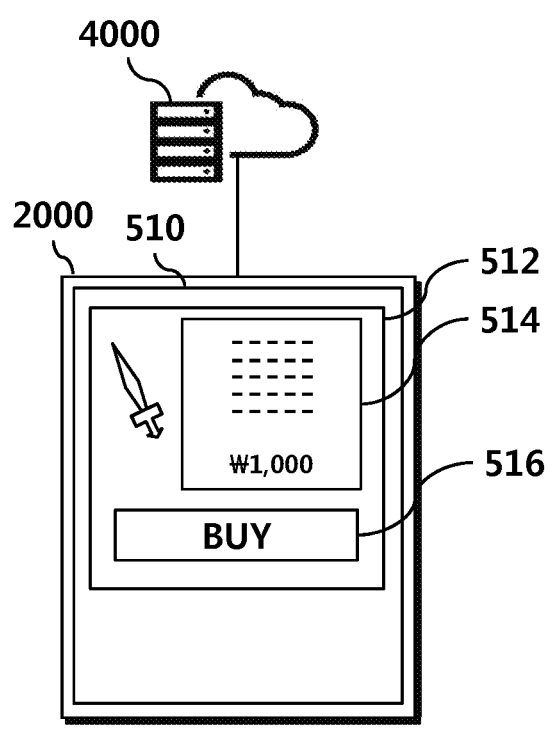
FIG. 5 is a diagram for explaining a method for changing various properties of an object according to an embodiment.

FIG. 5 is a diagram for explaining a method for changing various properties of an object according to an embodiment.

Referring to FIG. 5, a purchase GUI 512 of a knife object is displayed in a game GUI 510, and description 514 of the knife object may help a user of an electronic device 2000 to determine to purchase the knife object.

According to an embodiment, when a code provided by a user is valid and a predetermined condition is satisfied, for example, when the user selects a purchase button 516 for the knife object to purchase the knife object with a transaction means associated with the code, the server 4000 may change a property of the knife object from a first value to a second value. The property of the object may include a price of the object, a use requirement, a wearing requirement, a quantity, performance, and an expiration period, but is not limited thereto. For example, by changing the property of the knife object, a price of the knife object may decrease, or a wearing requirement, such as a level requirement, for the knife object may decrease. For example, the number of knife objects may increase, performance of the knife object may be improved, or expiration period of the knife object may increase.

According to an embodiment, by changing the properties of various objects, customized promotions may be provided to users.

Figure 6:
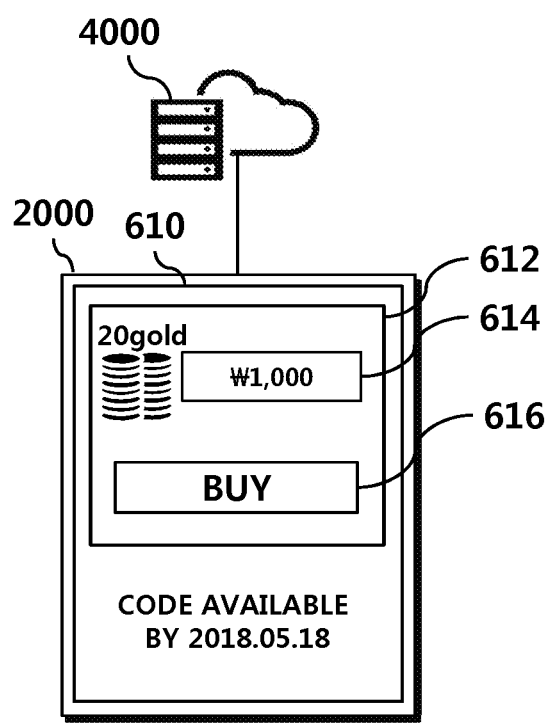
FIG. 6 is a diagram for explaining expiration of a code according to an embodiment.

FIG. 6 is a diagram for explaining expiration of a code according to an embodiment.

Referring to FIG. 6, a purchase GUI 612 of a money object is displayed in a game GUI 610, and description 614 of the money object may help a user of an electronic device 2000 to determine to purchase the money object.

In an embodiment, a code provided by a user may expire after a predetermined period of time has elapsed. That is, after a predetermined period of time, the code may be invalidated. The predetermined period may be determined based on a date when the code is entered. For example, the predetermined period may start from the date when the code is entered, but is not limited thereto. The predetermined period may start from a date of issuance of the code, or may be set by a game provider or a issuer of a transaction means in affiliation with the game provider. Therefore, after the code is provided, when the predetermined condition is not satisfied for a predetermined period, the property of the object may not be changed even if a predetermined condition is satisfied after the predetermined period.

Figure 7:
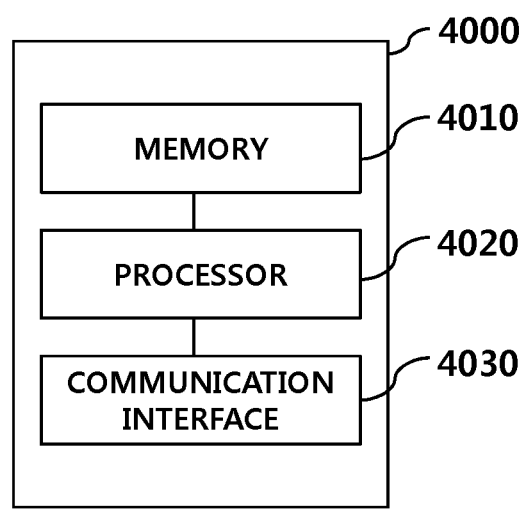
FIG. 7 is a block diagram of a server according to an embodiment.

FIG. 7 is a block diagram of a server according to an embodiment.

As shown in FIG. 7, the server 4000 may include a memory 4010, a processor 4020, and a communication interface 4030. However, all the components shown in FIG. 7 are not essential components of the client 4000. The server 4000 may be implemented by more or fewer components than the components shown in FIG. 7.

The memory 4010 may store programs and instructions for processing and controlling of the processor 4020, and store data inputted to or outputted from the server 4000.

The memory 4010 may store instructions that enable the server 4000 to perform various operations in accordance with embodiments herein. The memory 4010 may store information necessary for service of an online game. For example, the memory 4010 may store information about accounts, characters, and items of users, but is not limited thereto, and may store various information.

The memory 4010 may include at least one from among a flash memory type memory, a hard disk type memory, a multimedia card micro type memory, a card type memory (e.g., a secure digital (SD) memory, an extreme digital (XD) memory, etc.), a random access memory (RAM), a static RAM (SRAM), a read-only memory (ROM), a programmable ROM (PROM), an electrically erasable PROM (EEPROM), a magnetic memory, a magnetic disk, and an optical disc. Programs stored in the memory 4010 may be classified into a plurality of modules.

The processor 4020 may generally control the overall operation of the server 4000. For example, the processor 4020 may execute programs stored in the memory 4010 to control components included in the server 4000. The processor 4020 may include multiple processors, such as one or more central processing units (CPUs), one or more graphics processing units (GPUs), and/or combinations thereof.

The processor 4020 may be configured to execute instructions stored in memory 4010 to cause the server 4000 to perform various operations in accordance with various embodiments herein.

The communication interface 4030 may be an electronic circuit designed to communicate with other devices with conforming to a certain standard.

The communication interface 1510 may include a bluetooth communication interface, a bluetooth low energy (BLE) communication interface, a near field communication (NFC) interface, a wireless fidelity (Wi-Fi) communication interface, a ZigBee communication interface, an infrared data association (IrDA) communication interface, a Wi-Fi direct (WFD) communication interface, a ultra wideband (UWB) communication interface, an Ant+ communication interface, a Z-wave communication interface, a 3G communication interface, a 4G/LTE communication interface, and a 5G communication interface, but is not limited thereto.

Delivery of information in accordance with various embodiments herein may be performed through the communication interface 4030.

Figure 8:
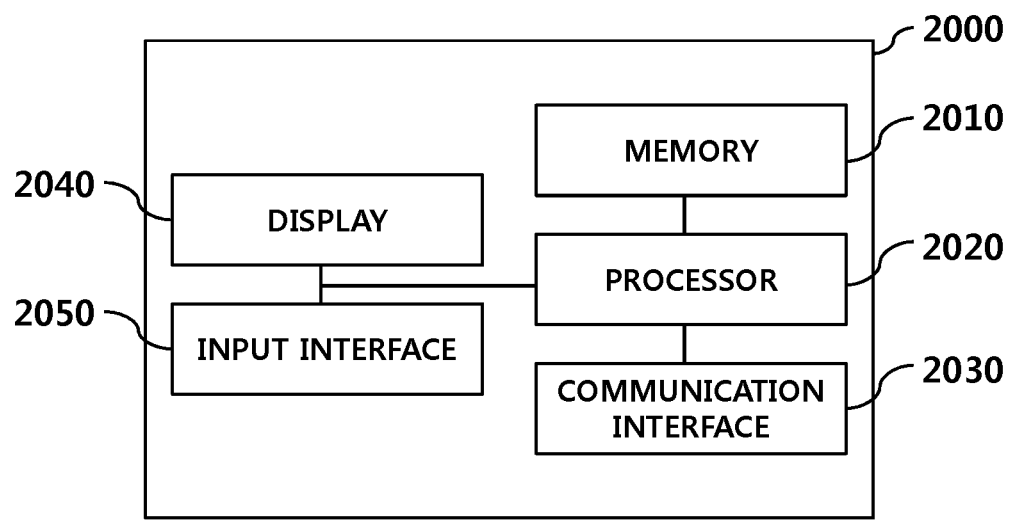
FIG. 8 is a block diagram of an electronic device according to an embodiment.

FIG. 8 is a block diagram of an electronic device according to an embodiment.

As shown in FIG. 8, the electronic device 2000 may include a memory 2010, a processor 2040, a communication interface 2050, and a display 2040, and an input interface 2050. However, all the components shown in FIG. 8 are not essential components of the electronic device 2000. The electronic device 2000 may be implemented by more or fewer components than the components shown in FIG. 8.

Explanation of the memory 2010, the processor 2020 and the communication interface 2030 of the electronic device 2000 may refer to the above explanation of the memory 4010, the processor 4020, and the communication interface 4030.

The memory 2010 may store instructions that enable the electronic device 2000 to perform various operations in accordance with embodiments herein. In an embodiment, the memory 2010 may store a game and data related thereto.

The processor 2020 may be configured to execute instructions stored in memory 2010 to cause the electronic device 2000 to perform various operations in accordance with various embodiments herein. In an embodiment, the processor 2020 may execute the game stored in the memory 2010, and may retrieve data related to the game.

Delivery of information in accordance with various embodiments herein may be performed through the communication interface 2030.

The display 2040 is a component that visualizes information processed by the processor 2020. The information displayed by the processor 2020 may be visualized on the display 2040. The display 2040 may be a liquid crystal display, a thin-film transistor-liquid crystal display, an organic light-emitting diode, a flexible display, a 3D display, and an electrophoretic display, but is not limited thereto. the display may also function as an input interface 2050 when the display and the touchpad are integrated together to form a touch screen, The input interface 2050 is a component designed to allow a user using the electronic device 2000 to interact with the electronic device 2000. For example, the input interface 2050 may be a key pad, a dome switch, a touch pad (e.g., contact electrostatic capacitive type, pressure resistive film type, infrared detection type, surface acoustic wave propagation type, integral strain gauge type, piezo-effect type, etc.), a jog wheel, or a jog switch, but is not limited thereto.

The apparatus described above may be implemented as a hardware component, a software component, and/or a combination of hardware components and software components. For example, apparatuses, devices, and components described herein may be implemented using a processor, a controller, an arithmetic logic unit (ALU), a digital signal processor, a microcomputer, a field programmable gate array (FPGA), a programmable logic unit (PLU), a microprocessor, a general purpose computer, a special purpose computer system, or any other device capable of executing instructions. A processing device, such as a processor, may execute an operating system (OS) and one or more software applications running on the OS. The processing device may also access, store, manipulate, process, and generate data in response to execution of the software. For ease of understanding, the processing device is described as singular, but those skilled in the art may recognize that the processing device may include a plurality of processing elements and/or a plurality of types of processing elements. For example, the processing device may include a plurality of processors or one or more processors and one or more controllers. The processing device may have other processing configurations, such as a parallel processor.

Software may include a computer program, a code, an instruction, or a combination thereof, and may be configured to configure the processing device and/or command the processing device independently or collectively. Software and/or data may be embodied in a machine, a component, a physical device, virtual equipment, a computer storage media or device, a transmitted signal wave permanently or temporarily, in order to be interpreted by the processing device or to provide the processing device with instructions or data. Software and/or data may be distributed over a networked computer system and stored or executed in a distributed manner. Software and/or data may be stored on one or more computer readable recording media configured for execution by one or more processors. The one or more computer readable recording media may be included in a computer program product. Software and/or data may be stored in a computer program product configured for execution by one or more processors.

The method according to an embodiment may be implemented in a form of program instructions that can be executed by various computing devices, and recorded in a computer readable medium. The computer readable medium may include program instructions, data files, data structures, or a combination thereof. The program instructions recorded on the medium may be specially designed and constructed for embodiments. Examples of the computer readable media include magnetic media such as hard disks, floppy disks and magnetic tapes; optical media such as CD-ROMs and DVDs; magneto-optical media such as floptical disks, and hardware devices such as ROM, RAM, flash memory, and the like which are specifically configured to store instructions. Examples of the program instructions may include machine language codes produced by a compiler, and high-level programming language code that can be executed by a computer using an interpreter or the like. The hardware devices described above may be configured to operate by one or more software modules to perform operations of embodiments, and vice versa.

While embodiments are explained with reference to exemplary embodiments and accompanying drawings, those who skilled in the art may modify and change the embodiments from the disclosure. For example, the techniques described may be performed in a different order than the described methods, and/or the described systems, structures, devices, circuits, or any components may be integrated or combined in a different form than the described methods, or may be replaced by their equivalents, in order to achieve substantially the same or similar results.

Therefore, other implementations, other embodiments, and equivalents to following claims are also within the scope the claims.

What is claimed is:

1. A game providing method comprising:
   storing a plurality of promotion codes associated with a product identity (PID) of a purchasable object in an online game and configured to change a property of the purchasable object;
   receiving a purchase request including transaction information for an object from a user of the online game, wherein the transaction information includes information regarding a transaction means;
   receiving a promotion code provided by the user;
   determining whether the received promotion code corresponds to one of the plurality of promotion codes;
   determining, whether the object requested by the user corresponds to the received promotion code;
   determining whether the received promotion code corresponds to the transaction means; and
   changing the property of the object requested by the user from a first value to a second value, when it is determined that the received promotion code corresponds to the one of the plurality of promotion codes, the object requested by the user corresponds to the received promotion code, and the received promotion code corresponds to the transaction means.

2. The game providing method of claim 1, wherein the plurality of promotion codes are printed on the transaction means, respectively.

3. The game providing method of claim 1, wherein the transaction means comprises a gift card.

4. The game providing method of claim 1, wherein the property of the object requested by the user remains unchanged when the received promotion code does not correspond to one of the plurality of promotion codes.

5. The game providing method of claim 1, wherein the property of the object requested by the user includes at least one of a price, a use requirement, a wearing requirement, a quantity, a performance, or an expiration period of the object.

6. The game providing method of claim 5, wherein the second value is less than the first value when the property of the object is a price of the object.

7. The game providing method of claim 5, wherein the second value is greater than the first value when the property of the object is a quantity of the object.

8. The game providing method of claim 1, wherein the promotion code is provided by at least one of a character input method, an optical character recognition method, a bar code recognition method, or a matrix code recognition method.

9. The game providing method of claim 1, wherein the received promotion code expires after a predetermined period of time.

10. The game providing method of claim 9, wherein the predetermined period is determined based on a date when the promotion code is provided by the user.

11. A game providing computer program product comprising a non-transitory computer readable medium storing instructions which, when executed by at least one processor, cause the at least one processor to carry out the method of claim 1.

12. A game providing apparatus, comprising:
    a memory storing instructions; and
    at least one processor configured to execute the instructions to:
    store a plurality of promotion codes associated with a purchasable object in an online game and configured to change a property of the purchasable object,
    receive a purchase request including transaction information for an object from a user of the online game, wherein the transaction information includes information regarding a transaction means,
    receive a promotion code provided by the user,
    determine whether the received promotion code corresponds to one of the plurality of promotion codes,
    determine, whether the object requested by the user corresponds to the received promotion code,
    determine whether the received promotion code corresponds to the transaction means, and
    change the property of the object requested by the user from a first value to a second value, when it is determined that the received promotion code corresponds to the one of the plurality of promotion codes, the object requested by the user corresponds to the received promotion code, and the received promotion code corresponds to the transaction means.

* * * * *